(12) United States Patent
Musgrove et al.

(10) Patent No.: US 10,018,718 B1
(45) Date of Patent: Jul. 10, 2018

(54) ARTIFACT REDUCTION WITHIN A SAR IMAGE

(71) Applicant: Sandia Corporation, Albuquerque, NM (US)

(72) Inventors: Cameron Musgrove, Albuquerque, NM (US); Richard M. Naething, Albuquerque, NM (US); Richard C. Ormesher, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 509 days.

(21) Appl. No.: 14/927,130

(22) Filed: Oct. 29, 2015

(51) Int. Cl.
*G01S 13/90* (2006.01)
*G01S 7/292* (2006.01)

(52) U.S. Cl.
CPC .......... *G01S 13/9035* (2013.01); *G01S 7/292* (2013.01)

(58) Field of Classification Search
CPC ...... G01S 13/9035; G01S 7/023; G01S 7/292; G01S 7/2927; G01S 7/354; G01S 7/414; G01S 13/5244
See application file for complete search history.

(56) References Cited

U.S. PATENT DOCUMENTS

| 4,109,247 A * | 8/1978 | Kaplan | G01S 13/765 342/127 |
| 5,486,830 A * | 1/1996 | Axline, Jr. | G01S 13/74 342/43 |
| 5,546,084 A | 8/1996 | Hindman | |
| 5,767,802 A * | 6/1998 | Kosowsky | G01S 13/78 342/25 C |
| 6,400,306 B1 * | 6/2002 | Nohara | G01S 13/5244 342/160 |
| 6,426,718 B1 | 7/2002 | Ridgway | |
| 6,577,266 B1 * | 6/2003 | Axline | G01S 13/765 342/42 |
| 6,791,489 B1 * | 9/2004 | Richardson | G01S 13/765 342/159 |

(Continued)

OTHER PUBLICATIONS

Deng, et al., "Clutter Reduction for Synthetic Aperture Radar Imagery Based on Adaptive Wavelet Packet Transform", Progress in Electromagnetics Research (PIER), 2000, vol. 29, pp. 1-23.

(Continued)

*Primary Examiner* — Peter M Bythrow
(74) *Attorney, Agent, or Firm* — Medley, Behrens & Lewis, LLC

(57) ABSTRACT

The various technologies presented herein relate to reducing and/or filtering undesired artifacts in a SAR image, wherein the artifacts are generated by RF interference resulting from a communication signal being included in a radar return which also comprises radar clutter. The radar return is separated into two subapertures, a first subaperture comprising radar clutter only, and a second subaperture comprising radar clutter and the communication signal. The communication signal is extracted from the second subaperture and reapplied to the initially received radar return. Reapplication of the communication signal to the radar return enables any undesired artifacts arising from the communication signal to have their return strength reduced or minimized, while maintaining any desired radar returns in the SAR image.

17 Claims, 12 Drawing Sheets

(56) References Cited

U.S. PATENT DOCUMENTS

| | | | |
|---|---|---|---|
| 6,861,971 B2* | 3/2005 | Russo | G01S 7/03 |
| | | | 342/175 |
| 7,030,805 B2* | 4/2006 | Ormesher | G01S 13/76 |
| | | | 342/42 |
| 7,515,091 B2* | 4/2009 | Meyers | G01S 7/003 |
| | | | 342/57 |
| 7,812,758 B2 | 10/2010 | Morris | |
| 2002/0003488 A1* | 1/2002 | Levin | G01S 7/023 |
| | | | 342/70 |

OTHER PUBLICATIONS

Kreithen, et al., "Discriminating Targets from Clutter", The Lincoln Laboratory Journal, vol. 6, No. 1, 1993, pp. 25-52.

* cited by examiner

ARTIFACT REDUCTION WITHIN A SAR IMAGE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Synthetic aperture radar (SAR) is a radar technique whereby a radar system moves relative to a target region, e.g., a radar antenna is located on an aircraft flying over a target region of interest. In conjunction with transmission and reception of electromagnetic radiation utilized for radar signaling (e.g., radar waves), the antenna can also be utilized to transmit and receive electromagnetic radiation for communication between the aircraft and another system (e.g., a ground based transmitter). Simultaneous SAR imaging and radio-frequency (RF) communication involves collecting data with the airborne radar platform while a ground based transmitter is simultaneously communicating to the radar antenna in a portion of the electromagnetic spectrum which can overlap an operating range of the radar. Hence, signaling received at the radar antenna can comprise of a combination of radar clutter and a communication signal.

The concepts presented supra are illustrated in FIG. 18, where an aircraft 1810, equipped with a radar antenna system 1820 is flying over a target terrain 1840, where the target terrain can also include man-made structures/buildings such as a transmission structure 1860. Radar waves 1830 are being transmitted from antenna system 1820, and reflected radar waves 1850 (e.g., reflected off of terrain 1840, structure 1860, etc.) are reflected back to antenna system 1820. As well as antenna system 1820 receiving reflected radar signals 1850, antenna system 1820 can also simultaneously receive communication signal 1870 transmitted from transmission structure 1860. However, the communication channel (e.g., communication signal 1870) can act as RF interference which can generate undesired artifacts in a SAR image and can thus effect a reduction in a quality of the SAR image and any other associated functions such as target identification within the SAR image. It is to be appreciated that transmission structure 1860 can be any suitable system, such as the previously mentioned transmission tower, as well as a vehicle based system, a portable system (e.g., carried by military personnel), etc.

SUMMARY

The following is a brief summary of subject matter that is described in greater detail herein. This summary is not intended to be limiting as to the scope of the claims.

Various exemplary embodiments presented herein relate to reducing and/or filtering artifacts from synthetic aperture radar (SAR) image data, wherein the artifacts result from radio frequency (RF) interference between a communication signal and radar clutter in a radar return. In an exemplary embodiment, a signal detection system can be configured to receive a signal comprising a combination of a communication signal and radar clutter. In an embodiment, the communication signal can have a frequency configured in accordance with a frequency bandwidth of a radar transmission signal originating the radar clutter.

In an embodiment, the radar return can be deramped and sampled. The radar return can be further separated into two subapertures, a first subaperture comprising radar clutter only, and a second subaperture comprising radar clutter and the communication signal. The communication signal can be identified and extracted from the second subaperture. Subsequently, the communication signal can be processed and reapplied to the initially received radar return. Reapplication of the communication signal to the radar return enables any undesired artifacts arising from the communication signal to have their return strength reduced or minimized, while any desired radar returns (e.g., from a target) are maintained in the SAR image. During processing of the communication signal, a spectral estimation of the communication signal can be determined, and the communication signal spectral estimation can be applied to the radar return (e.g., the deramped and sampled radar return) to filter any artifacts in SAR image generated from the RF interference between the clutter and the communication signal.

Once the communication signal has been identified in a radar return, an artifact reduction process (e.g., utilizing an artifact reduction algorithm (ARA)) can be performed with the communication signal. A range compressed clutter filter data ($X_{2\_fil}$ (y, n)) is generated as part of the communication signal extraction process, wherein the $X_{2\_fil}$ (y, n) data is applied to a spectral estimation routine in the cross-range dimension. This provides clutter spectral estimation of the communications signal within the subaperture data set $x_2$(i, n) (e.g., which comprises both communication signal and clutter). During the spectral estimation process, linear predictive coefficients (LPC) are generated and are unique for the coarse range bins of the subaperture. However, it is desired to apply the LPCs on the original range compressed data set. Therefore, LPCs are interpolated in the range dimension. Further, a whitening filter, in the cross-range dimension, is applied to the rectangular resampled compressed data set. A Fourier transform of the filtered data set is applied in the cross-range dimension to generate the reconstructed SAR image.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
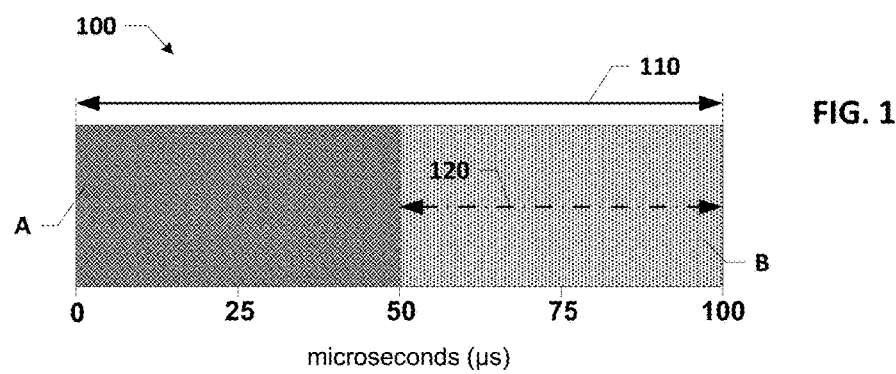
FIG. 1 is a block diagram illustrating an exemplary embodiment of a signal comprising both radar clutter and a communication signal.

Various technologies pertaining to reducing and/or filtering SAR image artifacts that are due to a communication signal being included in signaling comprising radar clutter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments relate to identifying a communication signal within a radar return and extracting the communication signal from the radar return. The radar return can include clutter, e.g., from a point target. Subsequently, the extracted communication signal can be reapplied to the original radar return to enable identification of artifacts arising from the communication signal, wherein the artifacts can be removed from a SAR image generated from the original radar return. Accordingly, the description comprises the following: (a) discussion of concepts relating to the original radar return which includes the clutter and the communication signal, (b) identification and extraction of the communication signal from the original radar return, and (c) application of the communication signal to the original radar return to facilitate removal of artifacts generated by the communication signal.

Figure 2:
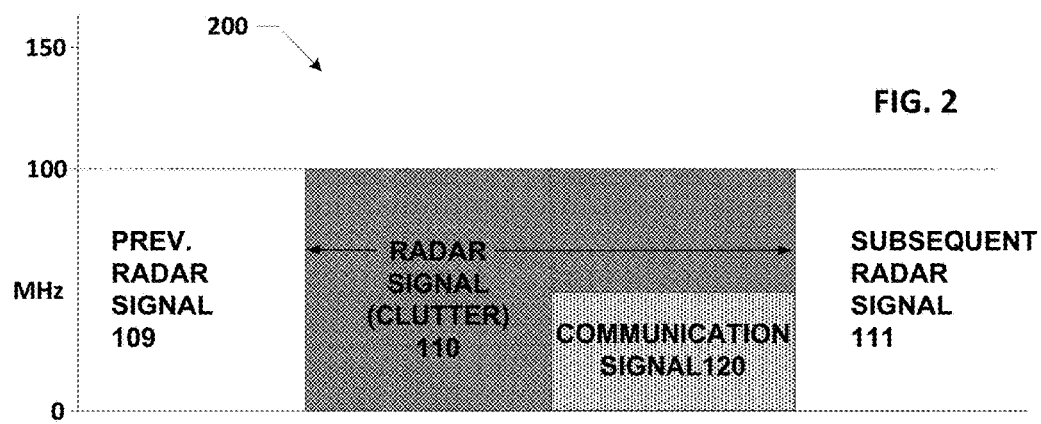
FIG. 2 is a block diagram illustrating an exemplary embodiment of a signal comprising both radar clutter and a communication signal.

FIGS. 1 and 2 illustrate representations 100 and 200 presenting a relationship between a radar signal and a communication signal, according to one or more embodiments. In the embodiment presented in FIG. 1, a radar signal 110 (e.g., a linear frequency modulated signal, a chirp signal) is configured to have a duration of 100 microseconds (μs) while a communication signal 120 (aka a communications channel, RF signaling) is configured with a duration having a portion of the duration of radar signal 110. In the embodiment illustrated in FIG. 1, communication signal 120 is configured to have a duration of 50 μs and is further positioned, timewise, to reside in the second half portion of the extant radar signal 110. Hence, as shown, regions A and B both comprise signaling having the radar clutter 110, while region B further comprises a communication signal 120 (e.g., RF signaling) in combination with the radar signaling clutter 110. Various embodiments presented herein describe various techniques and approaches to facilitate determination of the existence of the communication signal 120 and further, to enable extraction of data/information included in the communication signal 120 from the radar clutter 110.

Figure 3:
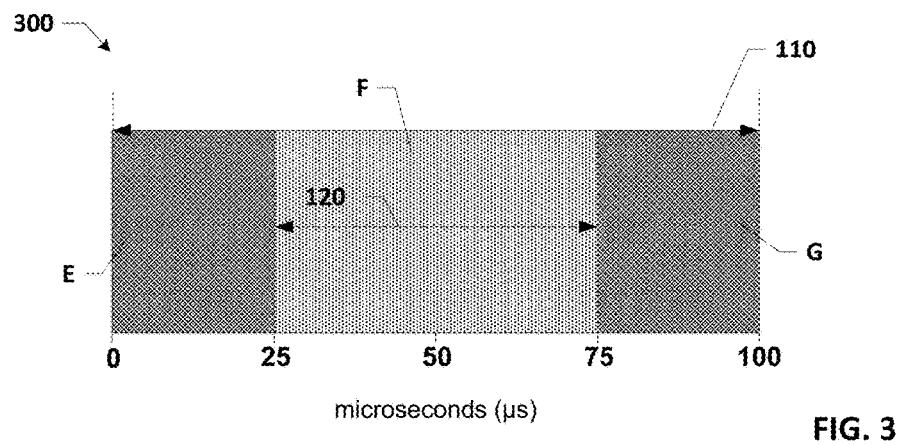
FIG. 3 is a block diagram illustrating an exemplary embodiment of a signal comprising both radar clutter and a communication signal.

It is to be appreciated that while FIG. 1 illustrates communication signal 120 to be located timewise in the second half of the duration of radar signal 110, the various embodiments presented herein are not so limited and the communication signal 120 can be located at any point relative to the temporal existence of radar signal 110. For example, turning briefly to FIG. 3, communication signal 120 can be located in the central portion of radar signal 110. As shown in FIG. 3, regions E and G comprise radar clutter 110 only, while central region F comprises both communication signaling 120 and radar clutter 110.

It is to be further appreciated that while FIG. 1 illustrates the communication signal 120 having a duration of half of that of the duration of the radar signal 110 (e.g., 50 μs versus 100 μs), the various embodiments presented herein are not so limited and the communication signal 120 can be of any duration relative to the duration of the radar signal 110 (e.g., 20 μs versus 100 μs, 50 μs versus 80 μs, 10 μs versus 90 μs, etc.). Furthermore, it is to be appreciated that while FIG. 1 illustrates radar signal 110 having a duration of 100 μs and communication signal 120 having a duration of 50 μs, the respective duration of each of the radar signal 110 and the communication signal 120 can be of any length. In an embodiment, the duration of the communication signal 120 can be less than the duration of the radar signal 110. In another embodiment, the duration of the radar signal 110 can be of a duration greater than the duration of the communication signal 120 duration to facilitate determination of a portion of signaling only comprising radar signal (e.g., only radar signal clutter) from which a comparison of the radar signal (e.g., regions A and B) with the signaling portion comprising radar signal and communication signaling (e.g., region C).

Turning to FIG. 2, the respective bandwidths of the radar signal and the communication signal are presented. In an embodiment, the respective signal bandwidths of radar signal 110 and communication signal 120 can be of any suitable magnitude. For example, as shown in FIG. 2, the bandwidth of radar signal 110 can be 100 megahertz (MHz) while the bandwidth of the communication signal 120 can be of a lesser magnitude, e.g., 50 MHz. As illustrated in FIG. 2, radar signal 110 can be operating as a chirp with radar signal 110 located in a stream of radar chirps, i.e., between a previous radar chirp 109 and a subsequent radar chirp 111.

Figure 18:
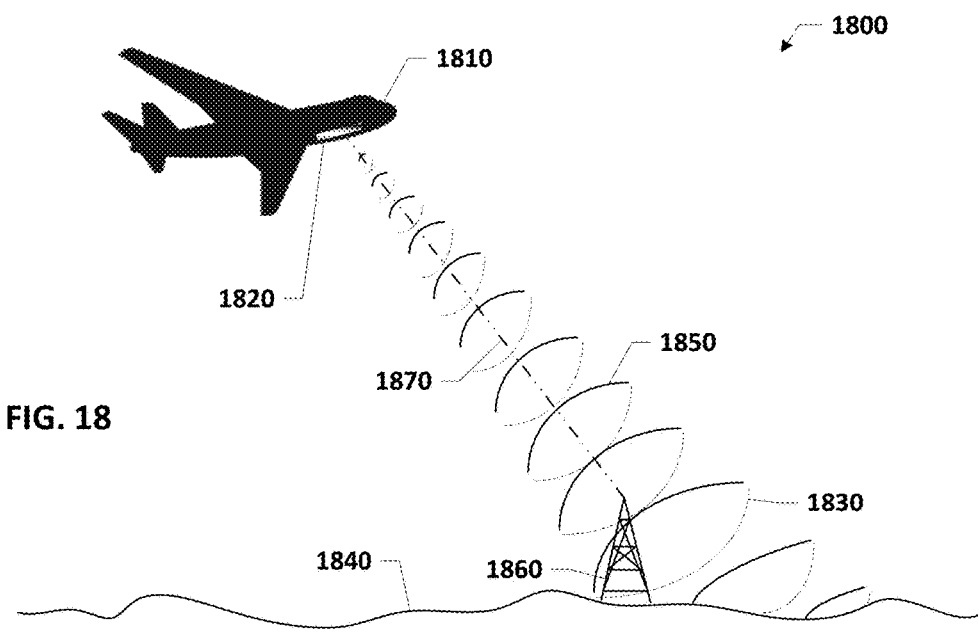
FIG. 18 illustrates a system for generating and capturing signals comprising radar signaling and communication signaling.

Hence, as illustrated in FIGS. 1 and 2, in conjunction with reference to FIG. 18, the various embodiments presented herein relate to identifying signaling which comprises a radar signal only, and based on such identification, extracting (aka filtering) the radar signal from signaling comprising both radar signal and communication signal to facilitate identification of the existence of a communication signal and further, to determine the data included in the communication signal. Such data included in a communication signal can be any of an initial indicator (e.g., a header data packet or a preamble data packet) indicating that communication data is to follow in one or more subsequent communication signals, an end-of-transmission signal, or the data can be any information conveyed between a transmitter (e.g., ground station 1860) and an antenna (e.g., antenna 1820). A communication signal to be transmitted from a communication apparatus to a radar apparatus can comprise a preamble followed by data symbols.

As further explained herein, filtering the radar clutter from a communications channel can facilitate provision of constant false alarm rate (CFAR) for detection of a preamble communication, and can further discriminate between a communication signal and normal radar clutter return. As conveyed in FIG. 1, in an embodiment, a band-limited communication transmitter can be utilized, where the band-limited communication transmitter can be configured to enable generation of multiple subaperture data sets at the radar. In an embodiment, by utilizing a transmitter that is RF band limited, the data support of a communications signal within a phase history domain is also limited in the range direction which enables generation of a plurality of subapertures, where each subaperture can have a unique signal response. Further, the various embodiments presented herein can be implemented in any suitable radar signaling system, where such signaling system can include a single antenna system in conjunction with low pulse repetition intervals as utilized in SAR imaging.

Figure 4:
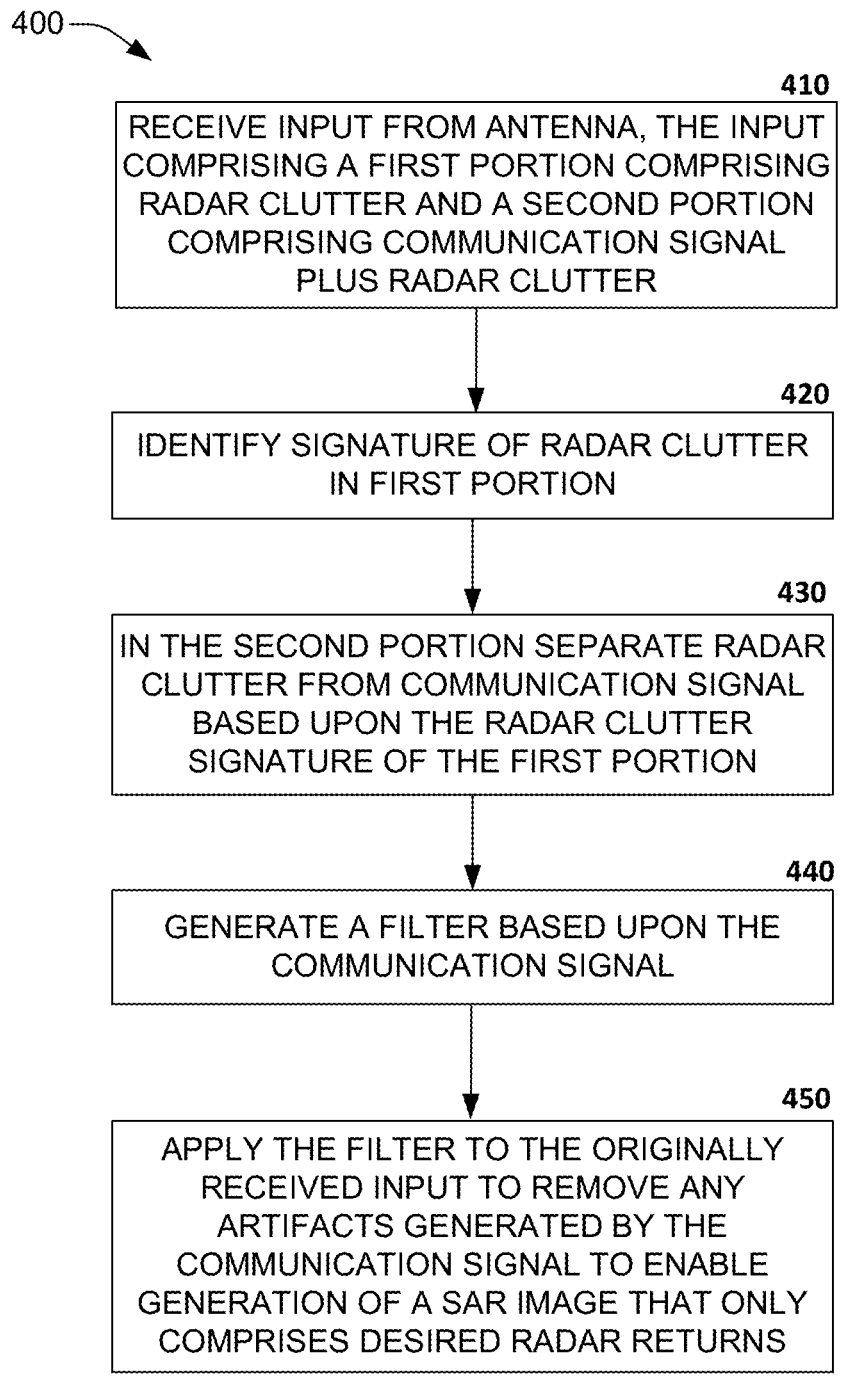
FIG. 4 is a flow diagram illustrating an exemplary methodology for reducing and/or filtering artifacts in a SAR image that are generated by a communication signal.
Figure 5:
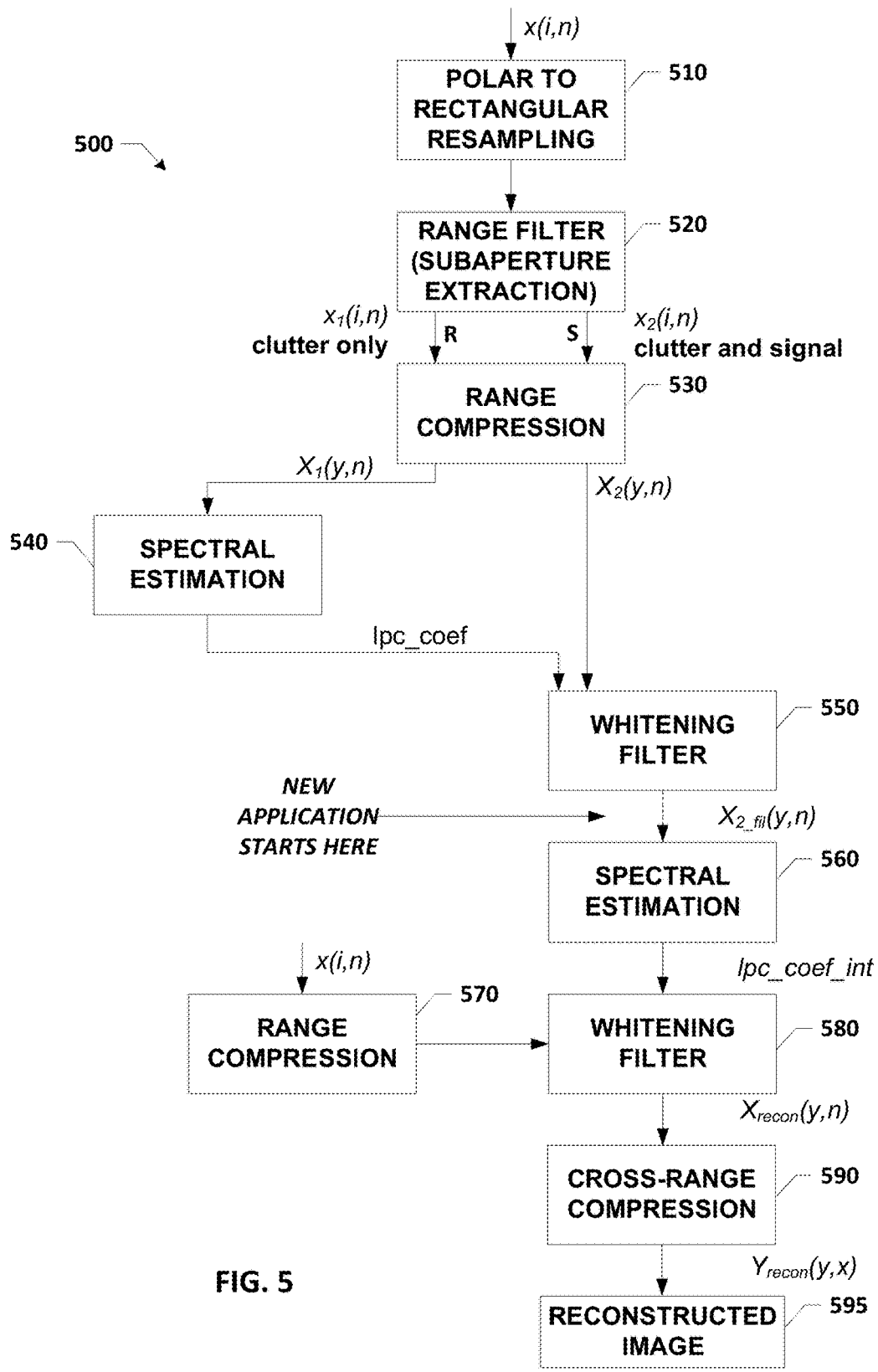
FIG. 5 is a flow diagram illustrating an exemplary methodology for reducing and/or filtering artifacts in a SAR image that are generated by a communication signal.

FIGS. 4 and 5 illustrate exemplary methodologies relating to reducing SAR image artifacts arising from a communication signal included in radar clutter. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

FIG. 4 presents an exemplary, high-level methodology relating to extracting a radar signal from signaling comprising both radar signaling and communication signaling to facilitate identification of the existence of a communication signal. At 410 a signal can be received from an antenna, whereby the signal can comprise a first portion comprising a radar signal and a second portion comprising a combination of a radar signal and a communication signal. As previously mentioned, the communication signaling received at the antenna can be received from a band-limited communication transmitter which can be configured to enable generation of multiple subaperture data sets at the radar. Hence, transmission of the second portion (e.g., the communication signal) can be configured in accordance with the rate of transmission the first portion (e.g., the chirp rate of transmission of the radar signal from the antenna). The communication signal can be configured to match a radio frequency center and chirp rate of the transmitted signal.

At 420, as described further herein, the radar signal can be identified (e.g., the radar signature) in the first portion of the radar signal/communication signal transmission received as an input at the antenna. Once the radar signal signature is known, the signature can act as a foundation against which existence of a communication signal can be determined.

At 430, based on determining the radar signal signature in the first portion, an equivalent signature (e.g., noise, clutter, etc.) can be filtered from the second portion. Any signaling (e.g., signal residue) remaining after the first radar signature has been filtered from the second portion can be considered to be the communication signal. In an embodiment, the magnitude of the communication signal bandwidth can be of a magnitude to facilitate determination of the existence of the communication signal. For example, even though the first radar signature has been determined with regard to noise, clutter, etc., the magnitude of the communication signal bandwidth is of a sufficient magnitude to facilitate detection relative to the first radar signature. For example, in an embodiment, the first radar signature is of a magnitude of 100 MHz, while the communication signal has a magnitude of 50 MHz.

At 440, a filter can be produced based upon the determined communication signal, wherein the filter enables identification and extraction of an artifact(s) generated by the communication signal.

At 450, the filter is applied to an originally received radar return to facilitate removal of an artifact(s) generated by the communication signal, thereby leaving only a desired radar return(s) received at the antenna, and in a SAR image generated therefrom. The acts presented in FIG. 4 are further expanded upon with reference to FIG. 5.

FIG. 5 illustrates an exemplary model 500 for determining the presence of a communication signal in a radar signal, and extracting the communication signal from the radar signal clutter. FIG. 5 can be read in conjunction with FIGS. 6-8, and further to aid readability the respective stages presented in FIG. 5 are presented supra as sub-sections identified with sub-headings. And to further aid readability various parameters and their respective transformations are also indicated for cross-reference to the various equations presented herein.

An overview of model 500 is briefly presented and further expanded upon in the sub-sections. At 510, initially phase history data (e.g., polar data comprising radar clutter and a communication signal) can be resampled to lie on a rectangular grid. At 520, the phase history data is subsequently filtered (e.g., in the range dimension) to create two subapertures, a first subaperture and a second subaperture. The first subaperture can include only radar clutter return (aka clutter-only data) while the second subaperture can include radar clutter return and a communications signal (aka clutter-and-signal data). At 530, a Fourier transform can be subsequently applied to the first subaperture and the second subaperture in the range dimension, generating range compressed data. A first range compressed data set (FIG. 5, element R) contains clutter data only, and a second range compressed data set (FIG. 5, element S) contains clutter-and-signal data. At 540, spectral estimation in the cross-range dimension can be further applied to the clutter-only range compressed data, element R. Spectral estimation in the cross-range dimension facilitates clutter filtering for the corresponding clutter-and-signal range compressed data, element S. At 550, a filter (e.g., a whitening filter), in the cross-range dimension, can then be applied to the range compressed data set, element S.

At 560, an artifact reduction operation (artifact reduction algorithm, ARA) can be utilized. During application of the ARA operation, the range compressed clutter filtered data, is applied to a spectral estimation routine in cross-range dimension. This provides spectral estimation of the communications signal within the subaperture data set $X_2$ (y, n) (signal and clutter). These linear predictive coefficients (LPC) are unique for the coarse range bins of the subaperture. However, it is desired to use these coefficients on the original range compressed data set. Therefore, we need to interpolate the coefficients in the range dimension. At 580, a whitening filter, in the cross-range dimension, is applied to the rectangular resampled compressed data set. At 590, a Fourier transfer of the filtered data set is applied in the cross-range dimension to provide the reconstructed SAR image. Details of each processing block follows.

Signal Model after Deramp Processing

Figure 6:
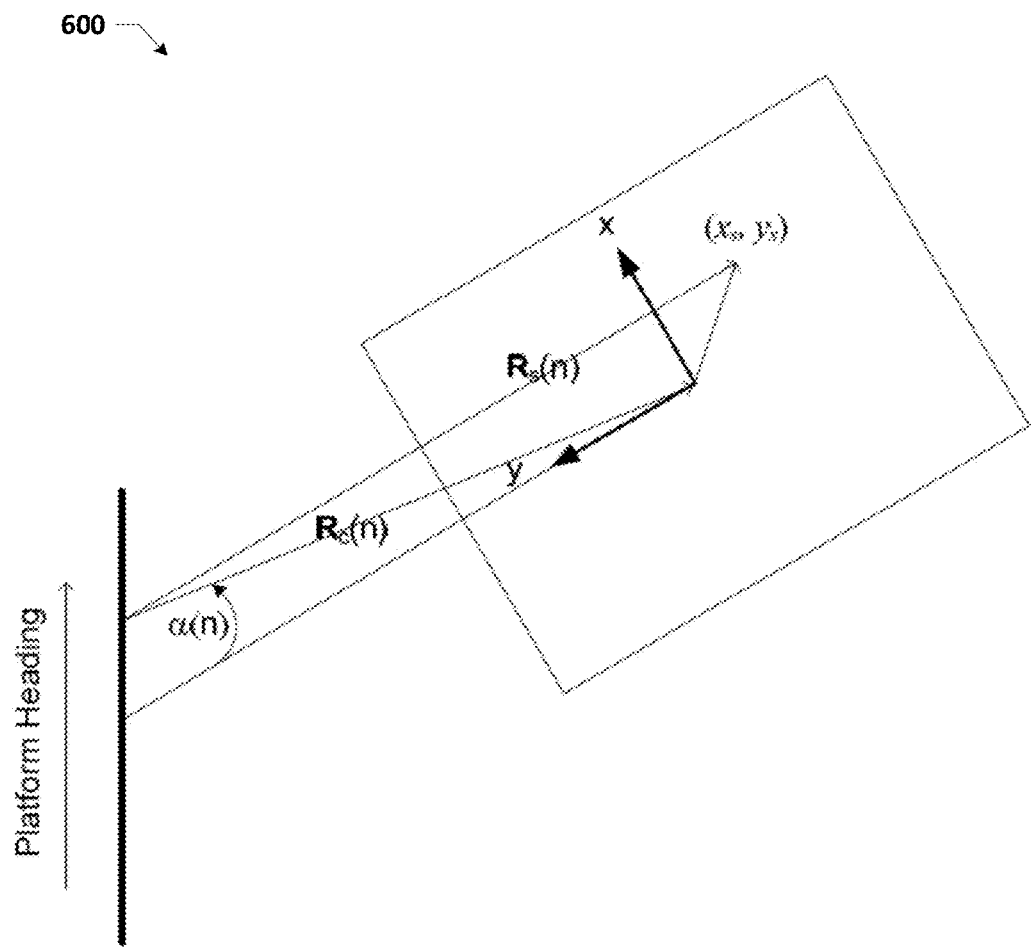
FIG. 6 is a block diagram illustrating an exemplary geometry of a signal comprising both radar clutter and a communication signal.

In an embodiment, a signal received at an antenna (e.g., antenna 1820) can comprise a radar return signal (e.g., radar waves or clutter 1850) from a point target and further a communication signal (e.g., signal 1870) simultaneously received on the communications channel. In a further embodiment, the radar signal can be linear frequency modulated and the communications signal can be designed to match the RF center frequency and the chirp rate of the transmitted radar signal. In another embodiment, the communications transmitter can be located at the same position as the point target. The geometry for a signal model according to the various embodiments presented herein, is illustrated in FIG. 6. At the radar (e.g., antenna 1820), the received signal can be deramped and sampled.

Figure 7:
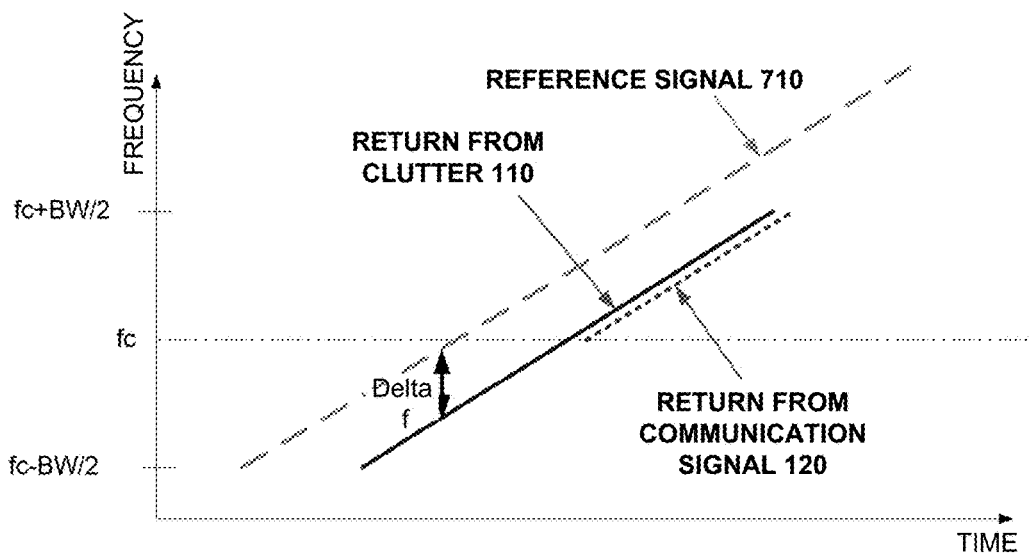
FIG. 7 is a block diagram illustrating an exemplary embodiment of a signal comprising both radar clutter and a communication signal prior to deramp processing.
Figure 8:
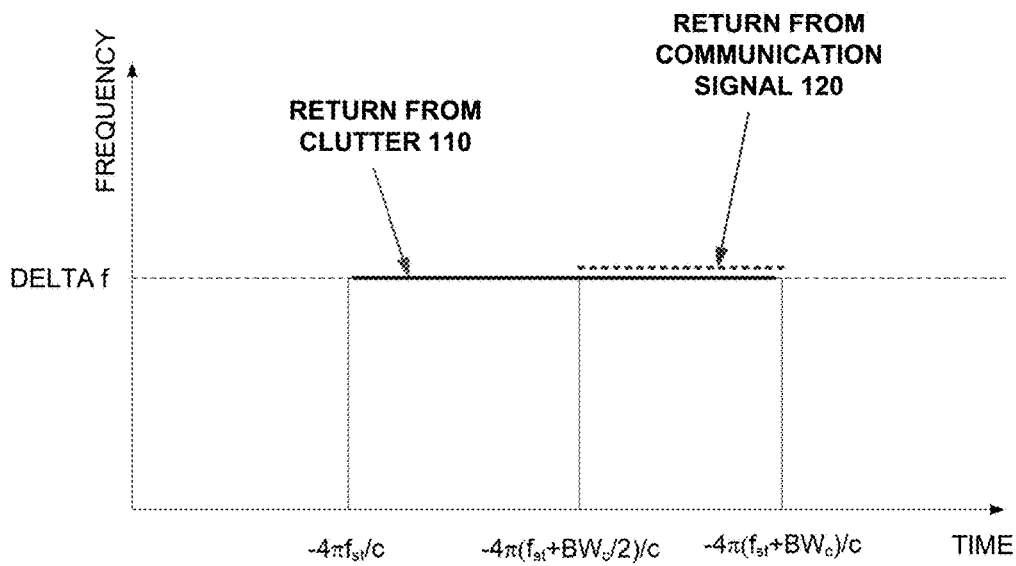
FIG. 8 is a block diagram illustrating an exemplary embodiment of a signal comprising both radar clutter and a communication signal after deramp processing.

The return signal before and after deramp processing is illustrated in FIGS. 7 and 8. FIG. 7 illustrates a return signal comprising both radar clutter 110 and a communication signal 120. In an embodiment, the communications signal 120 can have an RF bandwidth that is less than the radar clutter return 110. A reference signal 710 is a replica of the radar transmit signal that is delayed in time to match the time delay of a radar return from a known and fixed geographical reference point.

The received signal is mixed with the complex conjugate of the reference function to perform the deramp processing as shown in FIGS. 7 and 8. As illustrated, in an embodiment, the radar clutter return 110 can have a longer time (also called spatial frequency) extent then the communications signal 120. The sampled deramped received signal, x(i,n), is given as:

$$x(i,n)=x_t(i,n)+x_c(i,n) \text{ for } 0 \leq i < N_s-1 \text{ and } 0 \leq n < N_p-1 \quad \text{Eqn. 1}$$

where i is the fast time analog/digital (A/D) sample index, n is the radar pulses index, $N_s$ is the number of fast time samples, $N_p$ is the number of pulses, $x_t$ is the deramped signal return of the transmitted radar pulse, and $x_c$ is the deramped received communications signal.

Further the reference signal 710 is, $$x_{ref}(i, n) = \exp\left(j\left[2\pi f_c\left(iT_{ad} - \frac{2R_c(n)}{c}\right) + \gamma\left(iT_{ad} - \frac{2R_c(n)}{c}\right)^2\right]\right) \quad \text{Eqn. 2}$$

where $R_c(n)$ is the distance from the antenna phase center to a known and fixed geographical reference point at the $n^{th}$ transmitted radar pulse (as illustrated in FIG. 6).

After mixing the received RF signal with Eqn. 2, the received radar signal at the A/D output is expressed as:

$$x_t(i,n)=A_t\exp(j\cdot\theta_t(i,n)) \quad \text{Eqn. 3}$$

where $$\theta_t(i, n) = \frac{-4\pi}{c}(f_{st} + \gamma T_{ad}i)R_{sc}(n), \text{ for } 0 < i < N_s - 1 \quad \text{Eqn. 4}$$

and c is the speed of light in meters/second, $f_{st}$ is the start frequency of the deramped radar return pulse (aka signal) in Hertz (Hz), $\gamma$ is the chirp rate in Hz/sec, $T_{ad}$ is the A/D sample rate in seconds and $R_{sc}$ is the differential distance given by:

$$R_{sc}(n)=R_s(n)-R_c(n) \quad \text{Eqn. 5}$$

where $R_s(n)$ is the distance between the antenna phase center and the point target location at the $n^{th}$ transmitted radar pulse (as illustrated in FIG. 6).

It is to be noted that the spatial-frequency of the received radar signal is given as:

$$\frac{-4\pi}{c}(f_{st} + \gamma T_{ad}i) \quad \text{Eqn. 6}$$

and is in units of radians/meter.

The RF bandwidth of the radar pulse, in Hz, is:

$$BW_t=\gamma T_{ad}(N_s-1) \quad \text{Eqn. 7}$$

where $N_s$ is the total number of A/D samples.

The signal return of the communications signal transmitted from the same locations is:

$$x_c(i,n)=A_c\exp(j\cdot\theta_c(i,n)) \quad \text{Eqn. 8}$$

where $A_c$ is the signal amplitude and $\theta_c$ is the phase term of the received communications signal, respectively.

The bandwidth of the received signal can be selected such that the data support for the receive signal, in spatial frequency, can be divided into two separate sets or subapertures in the range dimension. One such subaperture includes signal return from only the point target (i.e., radar clutter) the other subaperture includes signal return from both the radar clutter return and the communications signal.

In an embodiment, the RF bandwidth of the communication signal 120 can be configured to be ½ the radar pulse bandwidth of the radar clutter 110, and thus, the communication signal 120 is designed such that the received phase term, $\theta_c$, is:

$$\theta_c(i, n) = 0 \quad \text{for } 0 < i < \frac{N_s}{2} \qquad \text{Eqn. 9}$$

$$\theta_c(i, n) = \frac{-4\pi}{c}(f_{st} + \gamma T_{ad}i)R_{sc} \quad \text{for } \frac{N_s}{2} < i < N_s \qquad \text{Eqn. 10}$$

The starting spatial-frequency of the received communication signal is:

$$f_{st\_c} = \frac{-4\pi}{c}\left(f_{st} + \gamma T_{ad}\frac{N_s}{2}\right) \qquad \text{Eqn. 11}$$

and the RF bandwidth is:

$$BW_c = \gamma T_{ad}\frac{N_s}{2} \qquad \text{Eqn. 12}$$

Polar to Rectangular Resampling

This subsection can be read in conjunction with FIG. 5, element 510. An initial step in processing the received data is to perform polar to rectangular resampling. The received signal is resampled such that the phase history, in the spatial-frequency domain, is sampled on a rectangular grid. $R_{sc}$ can be approximated as:

$$R_{sc} \approx \sin\alpha(n)x_t - \cos\alpha(n)y_t \qquad \text{Eqn. 13}$$

where $\alpha(n)$ is the angle between the reference pointing vector at the center of the aperture and the pointing vector at the $n^{th}$ pulse (as illustrated in FIG. 6). The coordinates $\{x_s, y_s\}$ are the x, y coordinates from the reference point to the target point (as illustrated in FIG. 6).

In the range or fast time dimension, a resampling operation can be performed such that the sample interval $\gamma T_{ad}i$ is replaced with the sample interval $$\frac{\gamma T_{ad}i}{\cos\alpha(n)}.$$

In the slow-time or cross-range dimension, for each row in fast time, i, a resampling operation can be performed such that the sample interval $$\frac{\gamma T_{ad} i \sin\alpha(n)}{\cos\alpha(n)}$$

is replaced with $\delta k_x n$. After resampling onto the rectangular grid, the phase of the clutter return can be:

$$\theta_r(i,n) = K_y(i)y_s + K_x(n)x_s \qquad \text{Eqn. 14}$$

where $$K_y(i) = \frac{-4\pi}{c}f_{st} + \delta k_y i, \text{ for } 0 \le i \le N_{Ky} - 1 \qquad \text{Eqn. 15}$$

$$K_x(n) = \frac{-\Delta K_x}{2} + \delta k_x n, \text{ for } 0 \le n \le N_{Kx} - 1 \qquad \text{Eqn. 16}$$

$$\delta k_y = \frac{-4\pi\gamma T_{ad}}{c} \qquad \text{Eqn. 17}$$

$$\Delta K_y = \delta k_y (N_{Ky} - 1) \qquad \text{Eqn. 18}$$

$$\Delta K_x = \frac{-4\pi f_{st}}{c}\left(\frac{\sin(\alpha(N_s))}{\cos(\alpha(N_s))}\right) \qquad \text{Eqn. 19}$$

$$\delta k_x = \frac{\Delta K_x}{N_{kx} - 1} \qquad \text{Eqn. 20}$$

where $N_{kx}$ and $N_{ky}$ can be chosen based on the desired sampling in the spatial domain.

The phase response of the communications signal after resampling can be:

$$\theta_c(i, n) \approx K(i)y_s + K_x(n)x_s \text{ for } \begin{array}{c} N_{Kl} \le i \le N_{Ky} - 1 \\ 0 \le n \le N_{Kx} - 1 \end{array} \qquad \text{Eqn. 21}$$

and zero elsewhere.

The range bandwidth, in spatial frequency, for the communications signal 120 (Eqn. 21) can be approximated as:

$$\Delta K_y = \frac{-4\pi}{c}\left(f_{st} + \gamma T_{ad}\frac{N_s}{2}\right) \qquad \text{Eqn. 22}$$

The lower limit on the index in Eqn. 21 can be:

$$N_{Kl} = \frac{-4\pi}{c}\left(f_{st} + \gamma T_{ad}\frac{N_s}{2}\right) / \delta k_y \qquad \text{Eqn. 23}$$

Again, it is to be noted that the bandwidth of the communication signal 120 can be selected such that the data support for the receive signal can be divided into two separate sets or subapertures in the range dimension. A first subaperture 910 (per FIG. 9) can contain a signal return from only the point target (e.g., returned radar signal 110). A second subaperture 920 (per FIG. 9) can contain a signal return from both the radar clutter return 110 and the communication signal 120.

Range Filtering

This subsection can be read in conjunction with FIG. 5, element 520. Subsequently, the phase data can be filtered in range by applying a simple brick wall filter in the $K_y$ domain. In an embodiment, the filtering can be accomplished by extracting the two separate subapertures 910 and 920 from the resampled phase history data.

Figure 9:
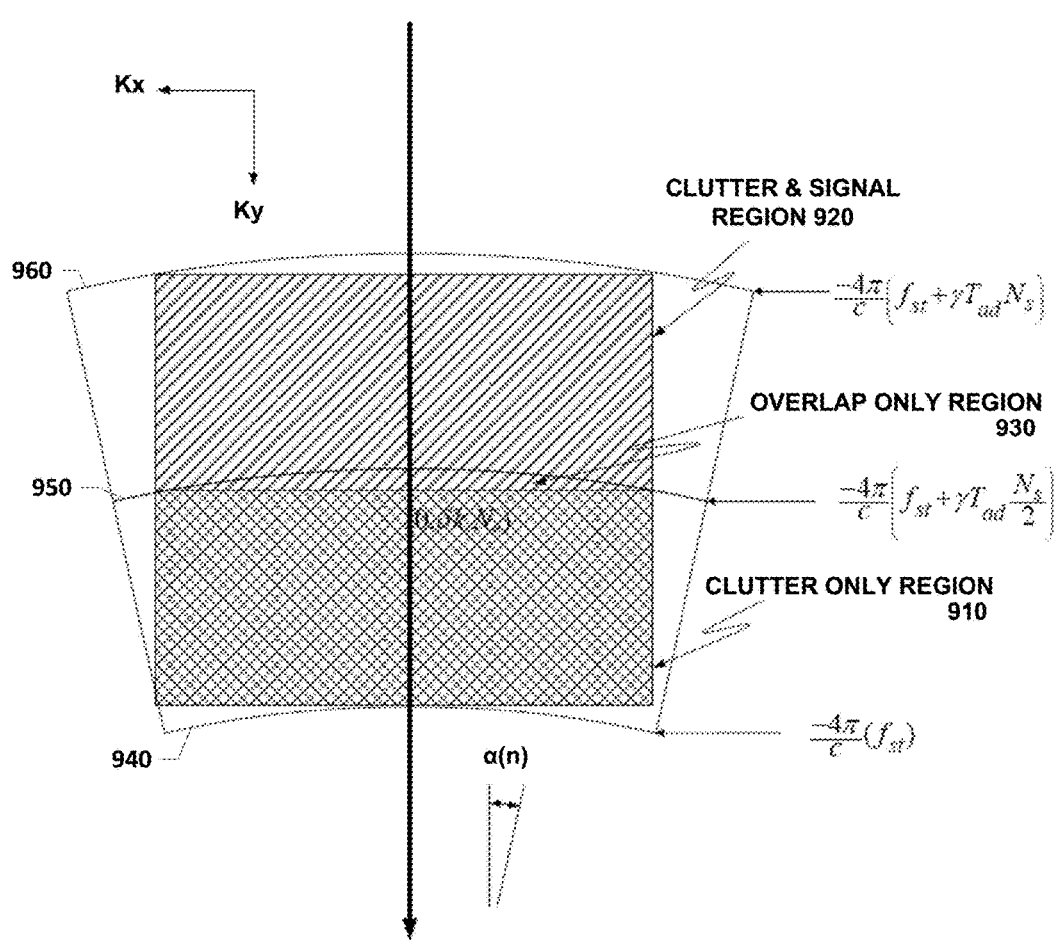
FIG. 9 is a block diagram illustrating an exemplary embodiment of a signal comprising both radar clutter and a communication signal having been processed to form two subapertures.

Two criteria are required when filtering or extracting the subapertures 910 and 920. Firstly, as mentioned previously, a first subaperture 910 contains signal return from only the clutter return while the second subaperture 920 contains signal return from both the clutter return and the communications signal. Secondly, in an embodiment, the data support for the clutter return should be the same length in both dimensions for both the first subaperture 910 and the second subaperture 920. FIG. 9 illustrates two regions that can be extracted as subapertures. The first region 910 contains mainly clutter return and has a spatial frequency, in the polar grid, that extends from $$\frac{-4\pi}{c}(f_{st})$$

(element 940) to $$\frac{-4\pi}{c}\left(f_{st} + \gamma T_{ad}\frac{N_s}{2}\right)$$

(element 950) and the second region 920 contains both clutter and emitter signal and extend from $$\frac{-4\pi}{c}\left(f_{st} + \gamma T_{ad}\frac{N_s}{2}\right)$$

(element 950) to $$\frac{-4\pi}{c}(f_{st} + \gamma T_{ad}N_s)$$

(element 960). The data is filtered in the rectangular grid and thus there is a small overlap area 930 in the clutter only filter region that contains signal and clutter. This example assumes a brick wall response of the emitter's filter. However, there is typically filter roll-off so this overlap region 930 can be of little concern.

For the clutter-only data 110, the signal phase can be filtered such that:

$$\theta_1(i,n) = \theta_t(i,n) \text{ for } 0 \leq i \leq N_{Kl} \text{ and } 0 \leq n \leq N_{Kx}-1 \quad \text{Eqn. 24}$$

and for the clutter-and-signal data 120 the resulting signal phase is:

$$\theta_2(i,n) = \theta_c(i+N_{Kl},n) \text{ for } 0 \leq i \leq N_{Kl} \text{ and } 0 \leq n \leq N_{Kx}-1 \quad \text{Eqn. 25}$$

The signal return for the first subaperture 910 is:

$$\begin{aligned} x_1(i, n) &= A_t \exp(j\theta_1(i, n)) \\ &= A_t \exp(j(K_y(i)y_s + K_x(n)x_s)) \end{aligned} \quad \text{Eqn. 26}$$

for $0 \leq i \leq N_{Kl}$ and $0 \leq n \leq N_{Kx} - 1$

The signal return for the second subaperture 920 is:

$$\begin{aligned} x_2(i, n) &= A_t \exp(j\theta_1(i + N_{Kl}, n)) + A_c \exp(j\theta_c(i + N_{Kl}, n)) \\ &= A_t \exp(j(K_y(i+N_{Kl})y_s + K_x(n)x_s)) + \\ &\quad A_c \exp(j(K_y(i+N_{Kl})y_s + K_x(n)x_s)) \end{aligned} \quad \text{Eqn. 27}$$

for $0 \leq i \leq N_{Kl}$ and $0 \leq n \leq N_{Kx}-1$

The signal, $x_1$, contains only energy from the clutter data 110 while the signal, $x_2$, contains energy from both the clutter signal 110 and the communication signal 120.

Range Compression

This subsection can be read in conjunction with FIG. 5, element 530. For each subaperture 910 and 920, a Fourier transform over the $K_y$ dimension can be applied to obtain range compression data per the following:

$$x_1(y,n) = FT\{x_1(i,n)\} \approx A_t \delta(y_s) \exp(jK_x(n)x_s) \quad \text{Eqn. 28}$$

and $$X_2(y,n) = FT\{x_1(i,n)\} \approx A_c \delta(y_s) \exp(\Theta_c) \exp(n)x_s) + A_t \delta(y_s) \exp(jK_x(n)x_s) \quad \text{Eqn. 29}$$

The spatial sampling in the range dimension is:

$$\delta y = \frac{D_y}{N_{Ky}} \quad \text{Eqn. 30}$$

where:

$$D_y = \frac{2\pi}{\sigma k_y} \quad \text{Eqn. 31}$$

The clutter signal energy 110 is now compressed and contained in the row indexed by $y=y_s$. In an embodiment, owing to the range and cross-range dimension of the first subaperture 910 and the second subaperture 920 being selected to be equal, the clutter signal for both range compressed data sets can be located in the same row and have the same spatial frequency in the cross-range dimension. The communications signal within $X_2$ is also in the row indexed by $y=y_s$ and has the same spatial frequency as the clutter return in the cross-range dimension. Because the range compressed data, $X_1$, contains only clutter return it can be used to estimate the clutter spectrum in the range compressed data, $X_2$, in the cross-range dimension. Using the clutter spectral estimate from $X_1$, a whitening filter in the cross-range dimension can be implemented, to filter the clutter energy. Removal of the clutter energy can leave residual signaling, whereby the residual signaling can be the communication signal 120, e.g., a preamble signal.

Figure 10:
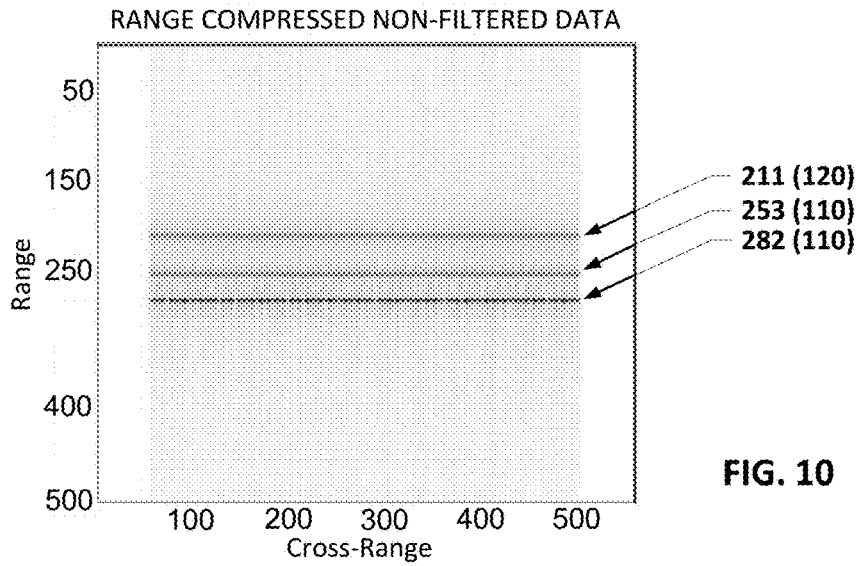
FIG. 10 is a screen capture of range filtering and compression according to an exemplary embodiment.
Figure 11:
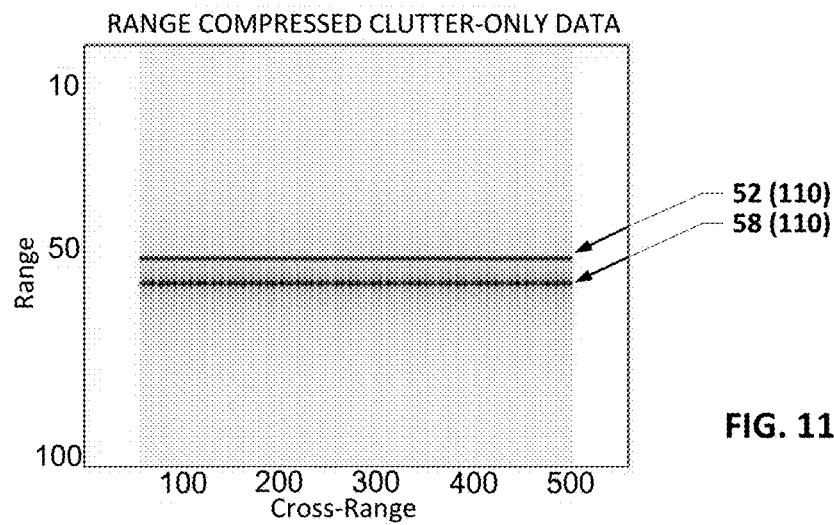
FIG. 11 is a screen capture of range filtering and compression according to an exemplary embodiment.
Figure 12:
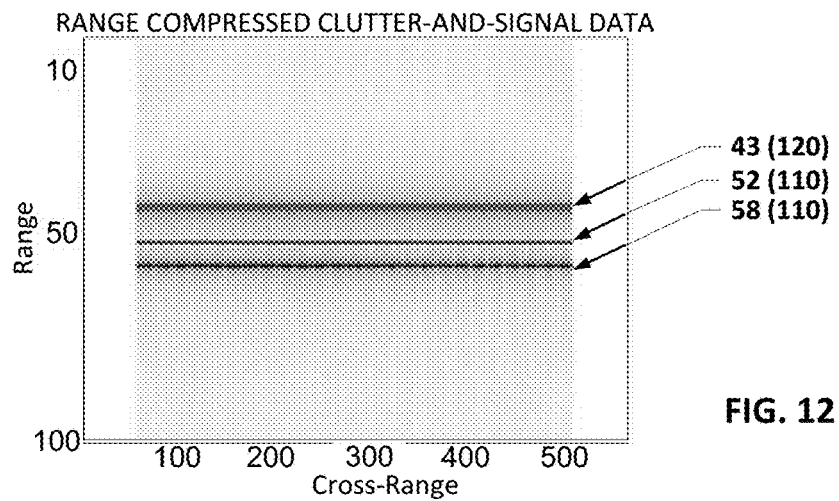
FIG. 12 is a screen capture of range filtering and compression according to an exemplary embodiment.

FIGS. 10-12 illustrate examples of range filtering and range compression according to at least one embodiment. In FIG. 10, the range compressed data of the original non-filtered data is illustrated. In the illustrated example, two simulated radar clutter returns 110 at range bins 253 and 282 and a simulated communication signal 120 at range bin 211 are shown. In the illustrated example, the communication signal 120 has approximately ⅕ the RF bandwidth of the radar clutter returns 110. FIG. 11 illustrates range compressed data for the clutter only subaperture 910, with clutter-only data 110 being indicated at range bin 52 and range bin 58, while FIG. 12 illustrates the range compressed data for the clutter-and-signal data subaperture 920, with clutter-only data 110 being indicated at range bin 52 and range bin 58, and further, a communication signal 120 at range bin 43. It is to be noted, in the exemplary embodiment, the total number of range bins has been reduce by ⅕ and the communication signal 120 has been filtered from the clutter-only data 110. For the purpose of illustrating range filtering, in this example the clutter return 110 was not co-located in range with the communication signal 120. Normally, clutter energy 110 would be extant at the same range bin as the communications signal 120 and clutter energy from the clutter-only data 910 can be used to estimate the clutter energy within the same range bin as the clutter-and-signal data 920. Spectral estimation and clutter filtering are described in the next two sections.

Spectral Estimation

This subsection can be read in conjunction with FIG. 5, element 540. To perform spectral estimation, for each row in $X_1(y, n)$ a linear predictive coding (LPC) analysis can be applied to determine the set of LPC filter parameters as follows:

$$\text{lpc\_coef(row,:)} = \text{lpc}(X_1(\text{row},:), N_{lpc}) \qquad \text{Eqn. 32}$$

where MATLAB notation indicates that the MATLAB lpc algorithm is applied to each row of $X_1$.

Whitening Filter

This subsection can be read in conjunction with FIG. 5, element 550. The resulting filter coefficients, lpc_coef(row, n), can be used with a finite impulse response filter to facilitate estimation and removal of the clutter return from the range compressed data $X_2$ as follows:

$$X_{2\_fil}(\text{row}, n) = X_2(\text{row}, n) - \sum_{k=1}^{N_{lpc}} \text{lpc\_coef(row}, k) X_2(\text{row}, n - k) \qquad \text{Eqn. 33}$$

Spectral Estimation

This subsection can be read in conjunction with FIG. 5, element 560. Below, in Eqns. 34-38, MATLAB notation is utilized to describe Spectral Estimation. To perform spectral estimation, for each row in $X_{2\_fil}(y, n)$ linear predictive coding is applied to determine the set of LPC filter parameters by computing:

$$\text{lpc\_coef(row,:)} = \text{lpc}(X_{2\_fil}(\text{row},:), N_{lpc}) \qquad \text{Eqn. 34}$$

for each row of $X_{2\_fil}$ where $N_{lpc}$ is the number of LPC filter parameters to estimate, and lpc is the MATLAB lpc algorithm The resulting filter coefficients, lpc_coef(row,n) are interpolated as follows.

First, the input sample rate x_in is defined:

$$x\_\text{in} = \text{linspace}(1, N_{ky}, N_{k1}) \qquad \text{Eqn. 35}$$

where $N_{ky}$ is the number of range compressed samples (or the FFT size used for range compression) for $X(y, n)$, $N_{k1}$ is the number of range compressed samples for $X_{2\_fil}(y, n)$, and the MATLAB linspace is used to generate the input sample vector.

Next, the output sample rate, x_out, is defined as:

$$x\_\text{out} = 1 : N_{ky} \qquad \text{Eqn. 36}$$

Then for each column in lpc_coef the MALTAB function interp1 is utilized to interpolate as follows:

$$\text{lpc\_coef\_int}(:,x) = \text{interp1}(x\_\text{in}, \text{lpc\_coef}(:,x), x\_\text{out}) \qquad \text{Eqn. 37}$$

Range Compression of Original Radar Return

This subsection can be read in conjunction with FIG. 5, element 570. To facilitate application of the extracted communications signal return to an originally received data set x(i,n), wherein the originally received data set has been resampled onto a rectangular grid producing, x(i,n):

$$x(i,n) = x_r(i,n) + x_c(i,n) \text{ for } 0 \leq i < N_s - 1 \text{ and } 0 \leq n < N_p - 1 \qquad \text{Eqn. 38}$$

wherein the original data x(i, n) in a rectangular coordinate format can undergo range compression to form a range compressed original data, X(y, n), per Eqn. 39:

$$X(y,n) = FT\{x(i,n)\} \qquad \text{Eqn. 39}$$

Whitening Filter

This subsection can be read in conjunction with FIG. 5, element 580. Finally, the lpc filter coefficients (e.g., from spectral estimation element 560) can be used with a finite impulse response filter to facilitate estimation and removal of the communications signal return from the range compressed full data set, X, as follows:

$$X_{recon}(y, n) = X(y, n) - \sum_{k=1}^{N_{lpc}} \text{lpc\_coeff\_int}(y, k) X(y, n - k + 1) \qquad \text{Eqn. 40}$$

Cross-Range Compression

This subsection can be read in conjunction with FIG. 5, element 590. To generate a final SAR image 595 which does not include any communication signal generated artifacts, a Fourier transform operation can be performed over the cross-range dimension, $K_x$, as follows:

$$Y_{recon}(y,x) = FT\{X_{recon}(y,n)\} \qquad \text{Eqn. 41}$$

In an alternative embodiment, the data can be uncompressed in range to allow for any windowing or image upsampling operations to create the final SAR image. It is also possible to not only uncompress $X_{recon}$, but to resample back into polar coordinates so that any type of SAR image formation can be applied.

Figure 13:
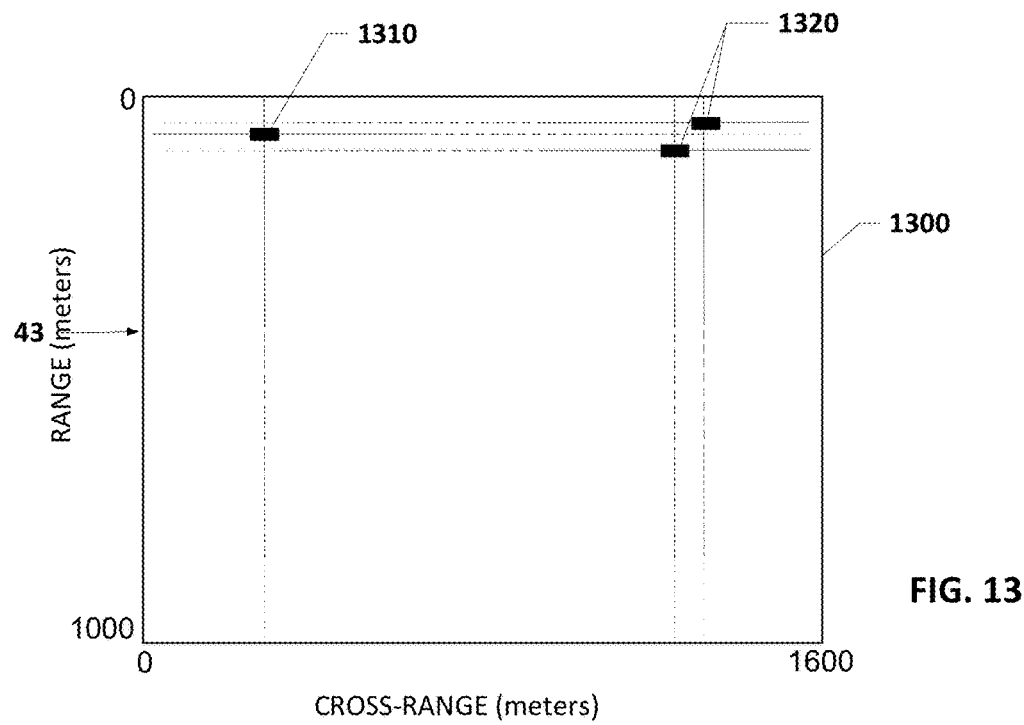
FIG. 13 is a schematic of a SAR image having undergone no artifact reduction, according to an exemplary embodiment.
Figure 14:
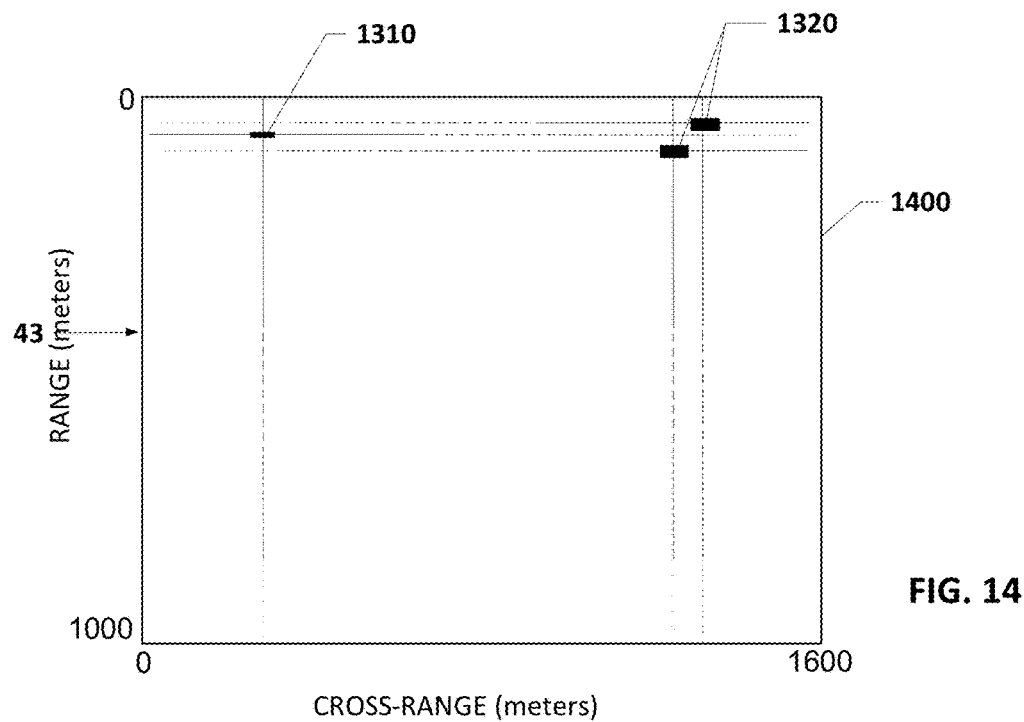
FIG. 14 is a schematic of a SAR image having undergone artifact reduction, according to an exemplary embodiment.

FIGS. 13 and 14 present an example and results of applying the ARA operation, as previously described. FIG. 13, image 1300 is a schematic representation of a SAR image with an undesired artifact 1310 and also desired radar returns 1320. As previously described, the undesired artifact 1310 can result from a communication signal included in a radar return interfering with radar clutter in the radar return. The SAR image 1300 is formed by taking the two dimensional Fourier transform of the rectangular resampled phase history data, x(i, n).

FIG. 14, image 1400 is a schematic representation of the SAR image 1300 after applying the ARA operation to the rectangular resampled phase history data x(i,n) and the clutter filter data $x_{2\_fil}(i, n)$. As represented in the schematic 1400, the return strength of the undesired artifact 1310 is less than the return strength of the desired radar returns 1320 (as indicated by the different size rectangles). In an example, prior to applying the ARA, the undesired artifact 1310 has a return strength of 154 dB compared the desired returns 1320 having a return strength of 153 dB. After applying the ARA, the return strength of the undesired artifact 1310 is 130 dB compared the desired returns 1320 maintaining a return strength of 153 dB. Hence, the return strength of the undesired artifact 1310 is reduced by approximately 24 dB.

Figure 15:
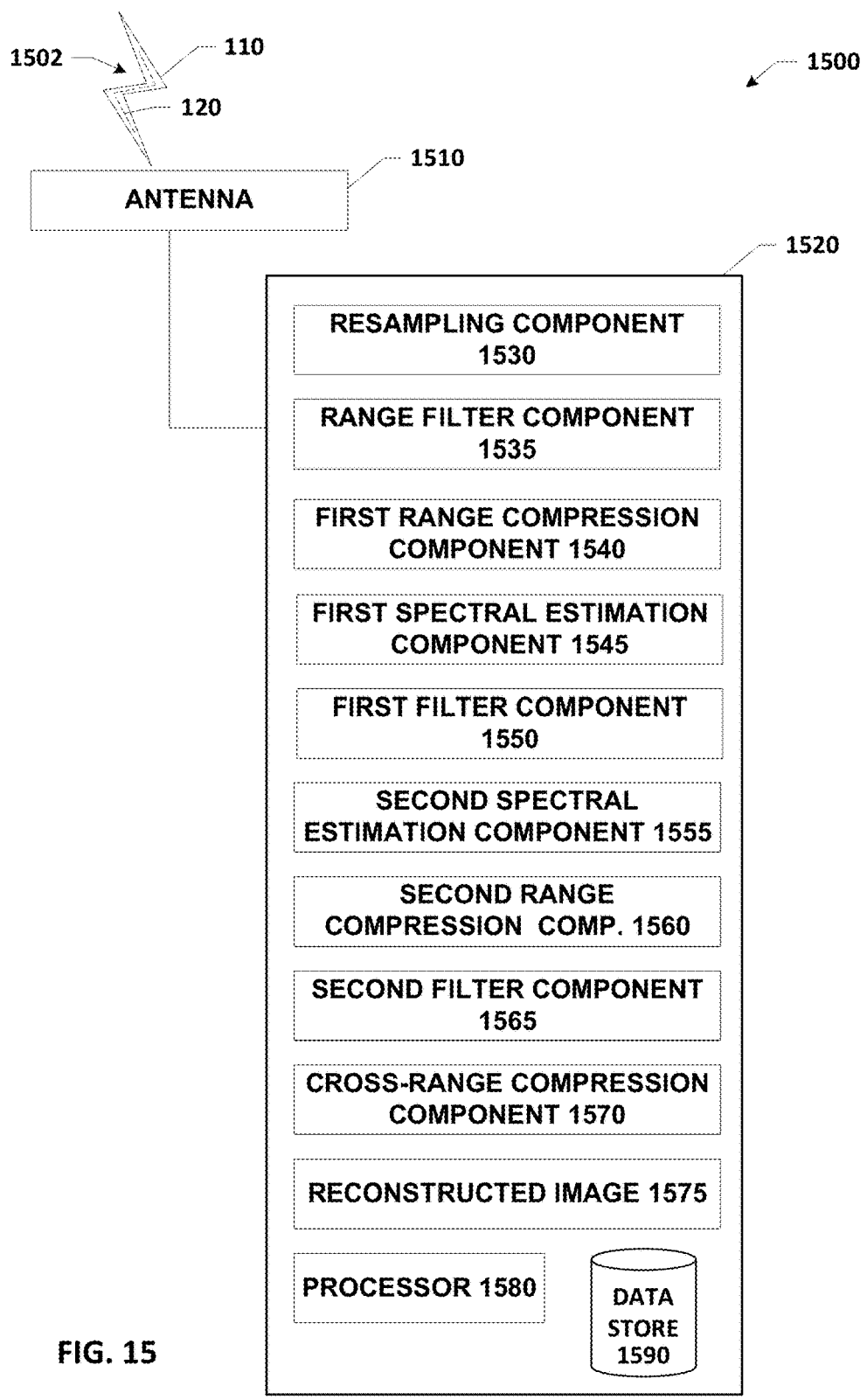
FIG. 15 is a block diagram illustrating an exemplary system for detecting and extracting a communication signal.

FIG. 15 illustrates an antenna system 1500 according to an embodiment. As previously described, a communication signal can be extracted from received signaling comprising a combination of radar clutter and the communication signal. As illustrated, a received signal 1502 can be received at an antenna 1510. In an embodiment, the received signal 1502 can comprise radar clutter 110 and further, a communication signal 120 (e.g., a preamble, etc.). Antenna 1510 is communicatively coupled with a signal detection system 1520 which comprises a plurality of components as required to facilitate operation of one or more embodiments as presented herein. As presented herein with particular reference to FIGS. 4-14, a number of operations can be performed to facilitate extraction of the communication signal 120 from radar clutter 110.

A resampling component 1530 can be utilized to transform a received signal 1502 from polar form to rectangular form (e.g., phase history data), per 510 of FIG. 5.

A range filter component 1535 can be utilized to filter the transformed received signal 1502 to facilitate generation of a first subaperture and a second subaperture, per 520 of FIG. 5. As previously mentioned, the first subaperture can comprise only radar clutter (e.g., only comprises a portion of radar clutter 110—FIG. 5, dataset R) and the second subaperture can comprise radar clutter and a communication signal (e.g., comprises a portion of radar clutter 110 and communication signal 120—FIG. 5, dataset S). In an embodiment, filtering can be performed in the range dimension.

A first range compression component 1540 can be utilized to apply a Fourier transform to dataset R and further to dataset S to generate range compressed data, per 530 of FIG. 5. In an embodiment, the Fourier transform can be applied in the range dimension.

A first spectral estimation component 1545 can be utilized to determine the degree and nature of the radar clutter 110 in dataset R, per 540 of FIG. 5. Based upon the determination, the degree and nature of the portion of radar clutter 110 in dataset S can be estimated. In an embodiment, the spectral estimation determination can be performed in the cross-range dimension.

A first filter component 1550 can be applied to the dataset S signaling, per 550 of FIG. 5. In an embodiment, filtering can be a whitening filter. In another embodiment, the filtering can be applied in the cross-range dimension.

A second spectral estimation component 1555 can be utilized to apply a spectral estimation routine in the cross-range dimension to the range compressed clutter filter data, $X_{2\_fil}(y, n)$. As previously mentioned, the second spectral estimation component 1555 provides clutter spectral estimation of the communications signal within the subaperture data set $x_2$ (i, n) (e.g., the second subaperture comprising both the communications signal 120 and radar clutter 110).

Linear predictive coefficients generated by the second spectral estimation component 1555 are unique for the coarse range bins of the subaperture. However, it is desired to use these coefficients on the original range compressed data set X(y,n). Therefore, the linear predictive coefficients undergo interpolation in the range dimension. A second range compression component 1560 can be utilized to generate X(y, n). Owing to the linear predictive coefficients being generated based upon the number of rows in the second subaperture, the linear predictive coefficients are interpolated to match the number of rows in the original data, per X(y, n).

A second filter component 1565, e.g., a whitening filter, in the cross-range dimension, is applied to the rectangular resampled range compressed data set generated by the second range compression component 1560.

A cross-range compression component 1570 can be utilized to apply a Fourier transform of the filtered data set in the cross-range dimension to enable generation of a reconstructed SAR image 1575.

As illustrated in FIG. 15, the various components 1530-1570 can be operated in accordance with operation of a processor 1580 and a data store 1590. In an embodiment, processor 1580 can facilitate execution of one or more components 1530-1570. Further, data store 1590 can store one or more received signals 1502, one or more extracted communication signals 120, radar clutter information 110, or any other pertinent information/data to be stored to facilitate operation of one or more embodiments as presented herein.

Figure 16:
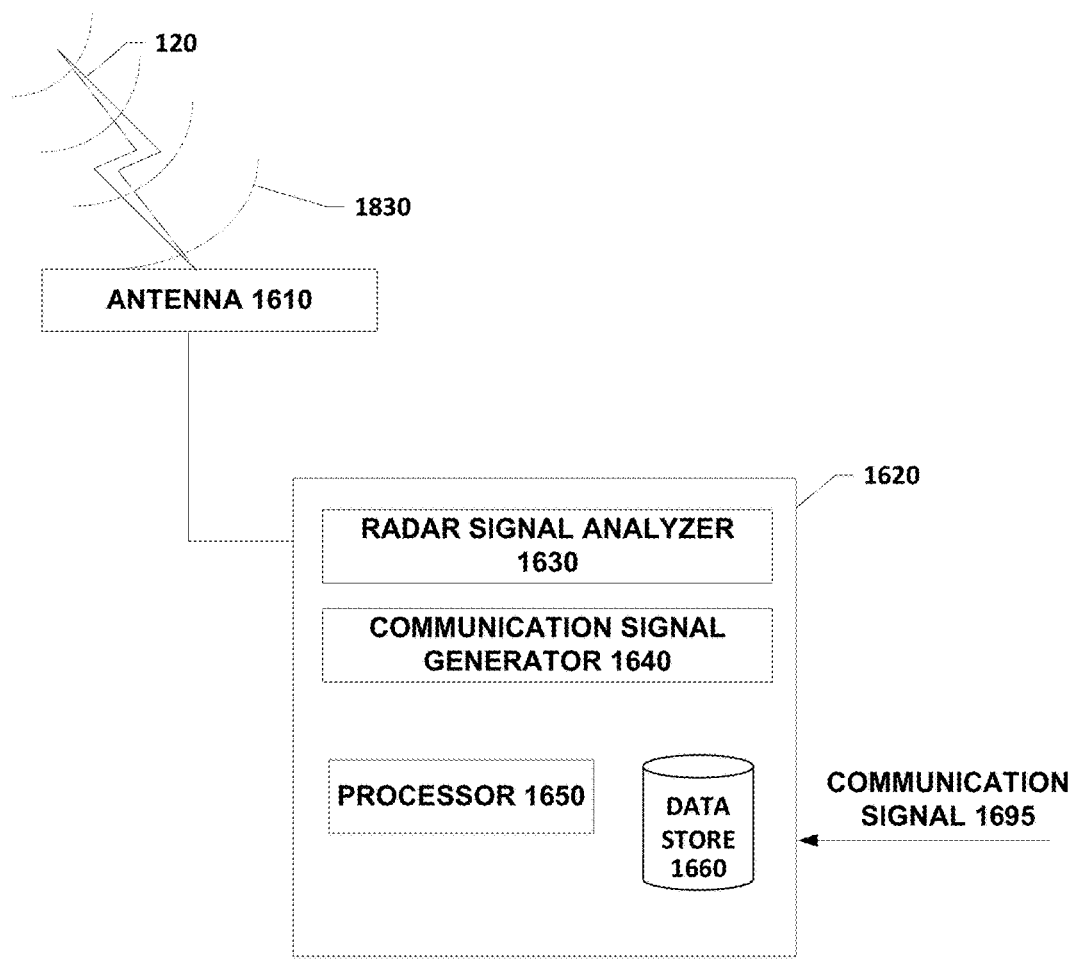
FIG. 16 is a block diagram illustrating an exemplary system for generating a communication signal.

FIG. 16 illustrates an antenna system 1600 according to an embodiment. As previously described, a communication signal can be extracted from received signaling comprising a combination of radar clutter and the communication signal. In an embodiment, a communication signal 120 can be transmitted based upon one or more parameters relating to a radar signal 1830 being received at an antenna 1610. Communication system 1620 can be utilized to receive the radar signal 1830, determine the one or more parameters pertinent to the radar signal 1830 and based thereon, configure a communication signal 1695 for transmission in accord with the radar signal 1830. In an embodiment, communication system 1620 can include a radar signal analyzer component 1630 which can be configured to receive the radar signal 1830 from antenna 1610 and perform one or more operations to quantify the radar signal 1830. As previously mentioned, the communication system 1620 can be RF band limited and hence configures the communication signal 1695 to be generated in accordance with the frequency (e.g., center frequency and chirp rate) of the radar signal 1830. The radar signal analyzer component 1630 can be configured to identify the frequency of the radar signal 1830 and any other information, e.g., the bandwidth of the radar signal 1830.

Based on the analysis generated by the radar signal analyzer component 1630, a communication signal generator component 1640 can be configured to receive a communication signal 1695 which is to be transmitted (e.g., via antenna 1610) and further configure the communication signal in accord with the radar signal 1830. For example, based upon the frequency of the radar signal 1830 the communication signal 1695 can be configured to be transmitted such that the communication signal 1695 is being transmitted at the same time as reflection of the radar signal 1830. Hence, as shown in FIGS. 1, 2, 7 and 8, the communication signal 120 is transmitted in conjunction with a clutter signal (e.g., clutter signal 110).

As illustrated in FIG. 16, components 1630 and 1640 can be operated in accordance with operation of a processor 1650 and a data store 1660. In an embodiment, processor 1650 can facilitate execution of either or both components 1630 and 1640. Further, data store 1660 can store information relating to one or more received radar signals 1830, one or more communication signals 1695, or any other pertinent information/data to be stored to facilitate operation of one or more embodiments as presented herein.

Figure 17:
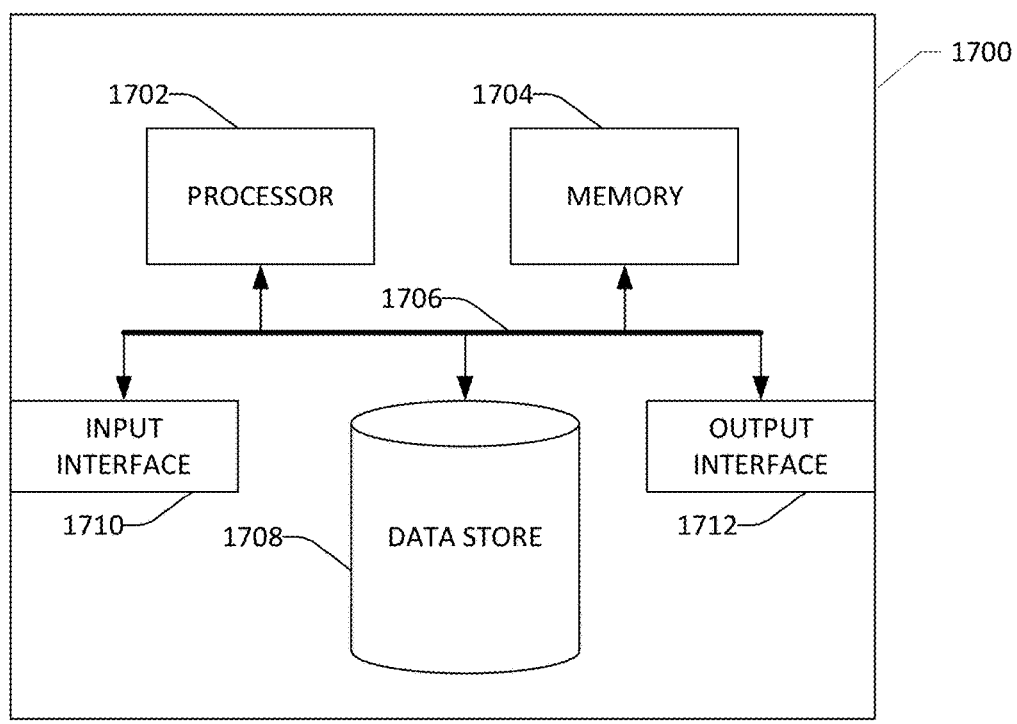
FIG. 17 illustrates an exemplary computing device.

Referring now to FIG. 17, a high-level illustration of an exemplary computing device 1700 that can be used in accordance with the systems and methodologies disclosed herein is illustrated. For instance, the computing device 1700 may be used in a system to determine existence of a communication signal in a received signal, wherein the received signal further comprises radar clutter signaling. The computing device 1700 includes at least one processor 1702 that executes instructions that are stored in a memory 1704. The instructions may be, for instance, instructions for implementing functionality described as being carried out by one or more components discussed above or instructions for implementing one or more of the methods described above. The processor 1702 may access the memory 1704 by way of a system bus 1706. In addition to storing executable instructions, the memory 1704 may also store operating parameters, required operating parameters, and so forth.

The computing device 1700 additionally includes a data store 1708 that is accessible by the processor 1702 by way of the system bus 1706. The data store 1708 may include executable instructions, operating parameters, required operating parameters, etc. The computing device 1700 also includes an input interface 1710 that allows external devices to communicate with the computing device 1700. For instance, the input interface 1710 may be used to receive instructions from an external computer device, from a user, etc. The computing device 1700 also includes an output interface 1712 that interfaces the computing device 1700 with one or more external devices. For example, the computing device 1700 may display text, images, etc., by way of the output interface 1712.

Additionally, while illustrated as a single system, it is to be understood that the computing device 1700 may be a distributed system. Thus, for instance, several devices may be in communication by way of a network connection and may collectively perform tasks described as being performed by the computing device 1700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
   extracting a communication signal from a received radar signal, wherein the radar signal comprises radar clutter and the communication signal is bandwidth limited according to at least one parameter associated with the radar clutter, wherein extracting the communication signal from the received radar signal comprises:
   converting a first portion of the radar clutter to a first rectangular array forming a first subaperture; and
   converting the communication signal and a second portion of the radar clutter to a second rectangular array forming a second subaperture, wherein the first subaperture and the second subaperture have the same area, and further wherein the communication signal is extracted from the received radar signal based upon the first subaperture and the second subaperture;
   responsive to extracting the communication signal from the received radar signal, determining a spectral estimation of the communication signal; and
   filtering the received radar signal with the communication signal spectral estimation, wherein the filtering removes from the received radar signal an artifact generated due to interference between the communication signal and the radar clutter.

2. The method of claim 1, wherein prior to extracting the communication signal from the received radar signal, the received radar signal is deramped and sampled.

3. The method of claim 1, wherein extracting the communication signal from the received radar signal further comprises:
   determining a radar signature of the first subaperture, wherein the communication signal is extracted from the received radar signal based upon the radar signature of the first subaperture.

4. The method of claim 3, wherein extracting the communication signal from the received radar signal further comprises:
   filtering the second subaperture with the radar signature of the first subaperture leaving a signal residue, wherein the signal residue is the communication signal.

5. The method of claim 1, wherein the communication signal is at least one of a preamble, a data symbol, or communication data.

6. The method of claim 1, wherein the communication signal has a shorter duration than the duration of the radar clutter.

7. The method of claim 1, wherein a bandwidth of the communication signal is less than a bandwidth of the radar clutter.

8. The method of claim 1, further comprising generating a radar image based upon the filtered received signal, wherein the radar image is a synthetic aperture radar image.

9. A system comprising:
   at least one processor; and
   memory that comprises instructions that, when executed by the at least one processor, cause the at least one processor to perform acts comprising:
   receiving a signal comprising a combination of a communication signal and radar clutter, wherein the communication signal has a frequency configured in accordance with a frequency of a radar transmission signal originating the radar clutter;
   extracting the communication signal from the received signal, wherein extracting the communication signal from the received signal comprises:
   converting the received signal from a polar format to a rectangular grid having an X dimension and a Y dimension; and
   separating the rectangular grid into two equally sized regions, a first region being a first subaperture comprising a first portion of the radar clutter and a second region being a second subaperture comprising a second portion of the radar clutter and the communication signal, wherein the communication signal is extracted from the received signal based upon the first subaperture and the second subaperture;

responsive to extracting the communication from the received signal, determining a spectral estimation of the communication signal; and filtering the received signal with the communication signal spectral estimation, wherein the filtering removes from the received signal an artifact generated due to interference between the communication signal and the radar clutter.

10. The system of claim 9, wherein extracting the communication signal from the received signal further comprises:

determining a radar signature of the first portion of the radar clutter, wherein the communication signal is extracted from the received signal based upon the radar signature.

11. The system of claim 9, wherein a bandwidth of the communication signal is configured in accordance with at least one parameter associated with the radar clutter.

12. The system of claim 9, wherein the communication signal has a duration one half the duration of the radar clutter.

13. The system of claim 9, wherein the communication signal is at least one of a preamble, a data symbol, or communication data.

14. The system of claim 9, wherein the radar clutter being based at least in part on a chirp modulation.

15. A radar system comprising a computer-readable storage medium comprising instructions that, when executed by a processor of the radar system, cause the processor to perform acts comprising:

receiving a signal comprising radar clutter and a communication signal;

generating a first subaperture comprising a first portion of the radar clutter;

generating a second subaperture comprising the communication signal and a second portion of the radar clutter, wherein the first subaperture has a same area as the second subaperture;

responsive to generating the first subaperture and the second subaperture, determining a signature of the first portion of the radar clutter;

filtering the second subaperture with the first portion signature to facilitate removal of the second portion of the radar clutter from the second subaperture;

extracting the communication signal from the second aperture based upon removing the second portion of the radar clutter from the second aperture;

determining a spectral estimation of the communication signal based upon the communication signal extracted from the second subaperture;

filtering the received signal with the communication signal spectral estimation, wherein the filtering removes from the received signal an artifact generated due to interference between the communication signal and the radar clutter; and generating a radar image based upon the filtered received signal.

16. The radar system of claim 15, wherein the communication signal comprising at least one of a preamble, a data symbol, or communication data.

17. The radar system of claim 15, wherein the communication signal being configured to be transmitted for half of a duration of the radar signal.

* * * * *